US008538659B2

(12) United States Patent
Wang et al.

(10) Patent No.: US 8,538,659 B2
(45) Date of Patent: Sep. 17, 2013

(54) METHOD AND APPARATUS FOR OPERATING AN ENGINE USING AN EQUIVALENCE RATIO COMPENSATION FACTOR

(75) Inventors: Wenbo Wang, Novi, MI (US); Layne K. Wiggins, Plymouth, MI (US); Jeffrey M. Kaiser, Highland, MI (US); Chao F Daniels, Superior Township, MI (US)

(73) Assignee: GM Global Technology Operations LLC

( * ) Notice: Subject to any disclaimer, the term of this patent is extended or adjusted under 35 U.S.C. 154(b) by 809 days.

(21) Appl. No.: 12/575,729

(22) Filed: Oct. 8, 2009

(65) Prior Publication Data

US 2011/0087418 A1  Apr. 14, 2011

(51) Int. Cl.
*G06F 19/00* (2011.01)
*G06F 7/00* (2006.01)
*G06F 17/00* (2006.01)
*G06G 7/70* (2006.01)
*F02D 41/00* (2006.01)

(52) U.S. Cl.
USPC ........... 701/101; 701/102; 701/103; 701/104; 701/109; 123/673; 123/674; 123/681; 123/683; 123/687

(58) Field of Classification Search
USPC ......... 701/101, 102, 103, 104, 109; 123/674, 123/673, 681, 683, 684, 687
See application file for complete search history.

(56) References Cited

U.S. PATENT DOCUMENTS

| | | | | |
|---|---|---|---|---|
| 4,667,640 A | * | 5/1987 | Sekozawa et al. | 123/492 |
| 4,903,668 A | * | 2/1990 | Ohata | 123/478 |
| 5,245,966 A | * | 9/1993 | Zhang et al. | 123/339.19 |
| 5,363,826 A | * | 11/1994 | Takaoka | 123/486 |
| 5,642,722 A | * | 7/1997 | Schumacher et al. | 123/673 |
| 5,755,212 A | * | 5/1998 | Ajima | 123/674 |
| 6,161,530 A | * | 12/2000 | Kakizaki et al. | 123/674 |
| 6,640,775 B2 | * | 11/2003 | Itoyama et al. | 123/305 |
| 6,789,534 B2 | * | 9/2004 | Yasui et al. | 123/673 |
| 6,990,402 B2 | * | 1/2006 | Yasui et al. | 701/108 |
| 7,010,413 B2 | * | 3/2006 | Dudek et al. | 701/102 |
| 7,021,282 B1 | * | 4/2006 | Livshiz et al. | 123/347 |
| 7,051,725 B2 | * | 5/2006 | Ikemoto et al. | 123/673 |
| 7,269,497 B2 | * | 9/2007 | Schreurs et al. | 701/108 |
| 7,295,912 B2 | * | 11/2007 | Yasui et al. | 701/103 |

(Continued)

OTHER PUBLICATIONS

Pet Anderson, Air Charge Estimation in Turbocharged Spark Ignition Engines, 2005, Linkoping University.*

*Primary Examiner* — Stephen K Cronin
*Assistant Examiner* — Raza Najmuddin

(57) ABSTRACT

A control system and method of controlling operation of an internal combustion engine includes a load determination module that determines an engine load, an equivalence ratio module that determines an equivalence ratio, a correction factor module that generates a correction factor based on the engine load, the equivalence ratio, and the engine speed and an engine operation module that regulates operation of the engine based on the correction factor.

20 Claims, 4 Drawing Sheets

(56) References Cited

U.S. PATENT DOCUMENTS

| | | | |
|---|---|---|---|
| 7,369,935 B2 * | 5/2008 | Cesario et al. | 701/106 |
| 7,440,838 B2 * | 10/2008 | Livshiz et al. | 701/103 |
| 7,469,180 B2 * | 12/2008 | Yasui et al. | 701/105 |
| 7,472,013 B1 * | 12/2008 | Wiggins et al. | 701/102 |
| 7,565,238 B2 * | 7/2009 | Nakagawa et al. | 701/113 |
| 7,614,384 B2 * | 11/2009 | Livshiz et al. | 123/399 |
| 7,987,840 B2 * | 8/2011 | Magner et al. | 123/703 |
| 2008/0021630 A1 * | 1/2008 | Russell et al. | 701/103 |
| 2008/0065310 A1 * | 3/2008 | Trask et al. | 701/103 |
| 2008/0147295 A1 * | 6/2008 | Sivasubramaniam et al. | 701/103 |
| 2008/0208436 A1 * | 8/2008 | Russell et al. | 701/103 |
| 2009/0012665 A1 * | 1/2009 | Brennan et al. | 701/22 |
| 2009/0090106 A1 * | 4/2009 | Muller | 60/602 |

* cited by examiner

METHOD AND APPARATUS FOR OPERATING AN ENGINE USING AN EQUIVALENCE RATIO COMPENSATION FACTOR

FIELD

The present disclosure relates to engine control systems, and more particularly to torque-based control systems and methods for an engine.

BACKGROUND

The background description provided herein is for the purpose of generally presenting the context of the disclosure. Work of the presently-named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases airflow into the engine. As the throttle area increases, the airflow into the engine increases. A fuel control system adjusts the rate that fuel is injected to provide a desired air/fuel mixture to the cylinders. As can be appreciated, increasing the air and fuel to the cylinders increases the torque output of the engine.

Engine control systems have been developed to accurately control engine speed output to achieve a desired engine speed. It has been found that the cooling effect of fuel evaporation can lower the charge temperature and increase the volume efficiency (VE). VE quantifies how efficient for the combustion chamber to get the fresh air given intake conditions such as intake pressure and temperature. The manifold absolute pressure (MAP) sensor is unable to indicate the manifold partial pressure for air accurately due to the cooling effect of the fuel evaporation, particularly at high-load conditions. Because the cooling effect happens downstream of the MAP sensor, the MAP sensor does not provide an accurate reading. Therefore, the MAP-based torque may be miscalculated.

SUMMARY

Accordingly, the present disclosure provides a method and system for compensating the air mass determination to compensate for the cooling effect of fuel evaporation in the intake system.

In one aspect of the disclosure, a method includes determining an engine load, determining an equivalence ratio, generating a correction factor based on the engine load, the equivalence ratio and an engine speed, and controlling operation of the engine based on the correction factor.

In another aspect of the disclosure, a control module and method of controlling operation of an internal combustion engine includes a load determination module that determines an engine load, an equivalence ratio module that determines an equivalence ratio, a correction factor module that generates a correction factor based on the engine load, the equivalence ratio, and the engine speed, and an engine operation module that regulates operation of the engine based on the correction factor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

Figure 1:
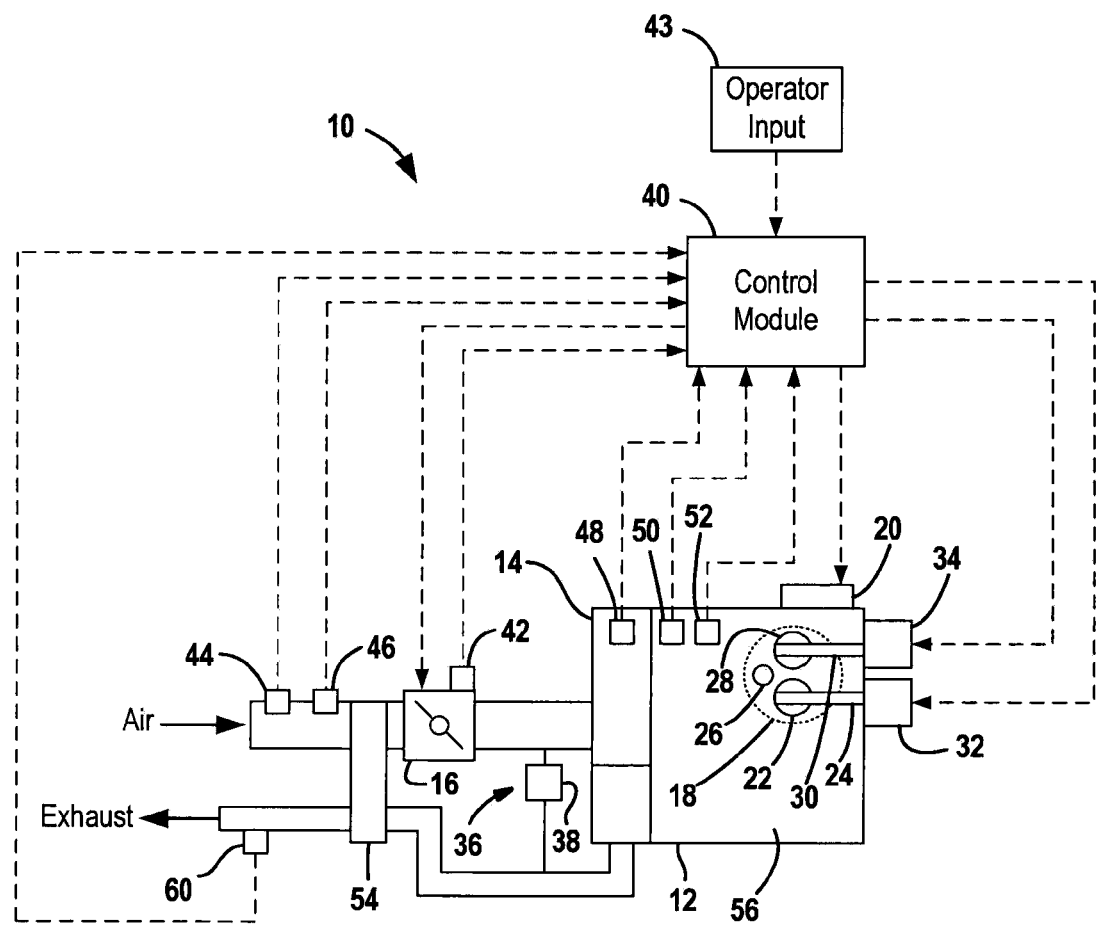
FIG. 1 is a schematic illustration of an exemplary engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase "at least one of" A, B, and C should be construed to mean a logical (A or B or C), using a non-exclusive logical OR. It should be understood that steps within a method may be executed in different order without altering the principles of the present disclosure.

As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an engine system 10 includes an engine 12 that combusts an air and fuel mixture to produce drive torque. Air is drawn into an intake manifold 14 through a throttle 16. The throttle 16 regulates mass airflow (MAF) into the intake manifold 14. Air within the intake manifold 14 is distributed into cylinders 18. Although a single cylinder 18 is illustrated, it can be appreciated that the coordinated torque control system of the present invention can be implemented in engines having a plurality of cylinders including, but not limited to, 2, 3, 4, 5, 6, 8, 10 and 12 cylinders.

A fuel injector (not shown) injects fuel that is combined with the air as it is drawn into the cylinder 18 through an intake port (fuel could also be directly injected into cylinder). The fuel injector may be an injector associated with an electronic or mechanical fuel injection system 20, a jet or port of a carburetor or another system for mixing fuel with intake air. The fuel injector is controlled to provide a desired air-to-fuel (NF) ratio within each cylinder 18.

An intake valve 22 selectively opens and closes to enable the air/fuel mixture to enter the cylinder 18. The intake valve position is regulated by an intake cam shaft 24. A piston (not shown) compresses the air/fuel mixture within the cylinder 18. A spark plug 26 initiates combustion of the air/fuel mixture, which drives the piston in the cylinder 18. The piston, in turn, drives a crankshaft (not shown) to produce drive torque. Combustion exhaust within the cylinder 18 is forced out an exhaust port when an exhaust valve 28 is in an open position. The exhaust valve position is regulated by an exhaust cam shaft 30. The exhaust is treated in an exhaust system and is released to the atmosphere. Although single intake and exhaust valves 22, 28 are illustrated, it can be appreciated that the engine 12 can include multiple intake and exhaust valves 22, 28 per cylinder 18.

The engine system 10 may include an intake cam phaser 32 and an exhaust cam phaser 34 that respectively regulate the rotational timing of the intake and exhaust cam shafts 24, 30. More specifically, the timing or phase angle of the respective intake and exhaust cam shafts 24, 30 may be retarded or advanced with respect to each other or with respect to a location of the piston within the cylinder 18 or crankshaft position. In this manner, the position of the intake and exhaust valves 22, 28 can be regulated with respect to each other or with respect to a location of the piston within the cylinder 18. By regulating the position of the intake valve 22 and the exhaust valve 28, the quantity of air/fuel mixture ingested into the cylinder 18 and therefore the engine torque is regulated.

The engine system 10 may also include an exhaust gas recirculation (EGR) system 36. The EGR system 36 includes an EGR valve 38 that regulates exhaust flow back into the intake manifold 14. The EGR system is generally implemented to regulate emissions. However, the mass of exhaust air that is circulated back into the intake manifold 14 also affects engine torque output.

A control module 40 operates the engine based on the torque-based engine control of the present disclosure. More specifically, the control module 40 generates a throttle control signal and a spark advance control signal based on a desired engine speed ($RPM_{DES}$). A throttle position signal is generated by a throttle position sensor (TPS) 42. An operator input 43, such as an accelerator pedal, generates an operator input signal. The control module 40 commands the throttle 16 to a steady-state position to achieve a desired throttle area ($A_{TH-RDES}$) and commands the spark timing to achieve a desired spark timing ($S_{DES}$). A throttle actuator (not shown) adjusts the throttle position based on the throttle control signal.

An intake air temperature (IAT) sensor 44 is responsive to a temperature of the intake airflow and generates an IAT signal. An MAF sensor 46 is responsive to the mass of the intake airflow and generates an MAF signal. A manifold absolute pressure (MAP) sensor 48 is responsive to the pressure within the intake manifold 14 and generates an MAP signal. An engine coolant temperature sensor 50 is responsive to a coolant temperature and generates an engine temperature signal. An engine speed sensor 52 is responsive to a rotational speed (i.e., RPM) of the engine 12 and generates in an engine speed signal. Each of the signals generated by the sensors is received by the control module 40.

The engine system 10 can also include a turbocharger or supercharger 54 that is driven by the engine 12 or engine exhaust. The turbo 54 compresses air drawn in from the intake air. More particularly, air is drawn into an intermediate chamber of the turbocharger 54. The air in the intermediate chamber is drawn into a compressor (not shown) and is compressed therein. The compressed air goes into the intake manifold.

An air/fuel sensor or lambda (λ) sensor 60 may be provided in the exhaust stream. The air/fuel sensor or λ sensor provides an indication as to the air/fuel ratio of the engine.

Figure 2:
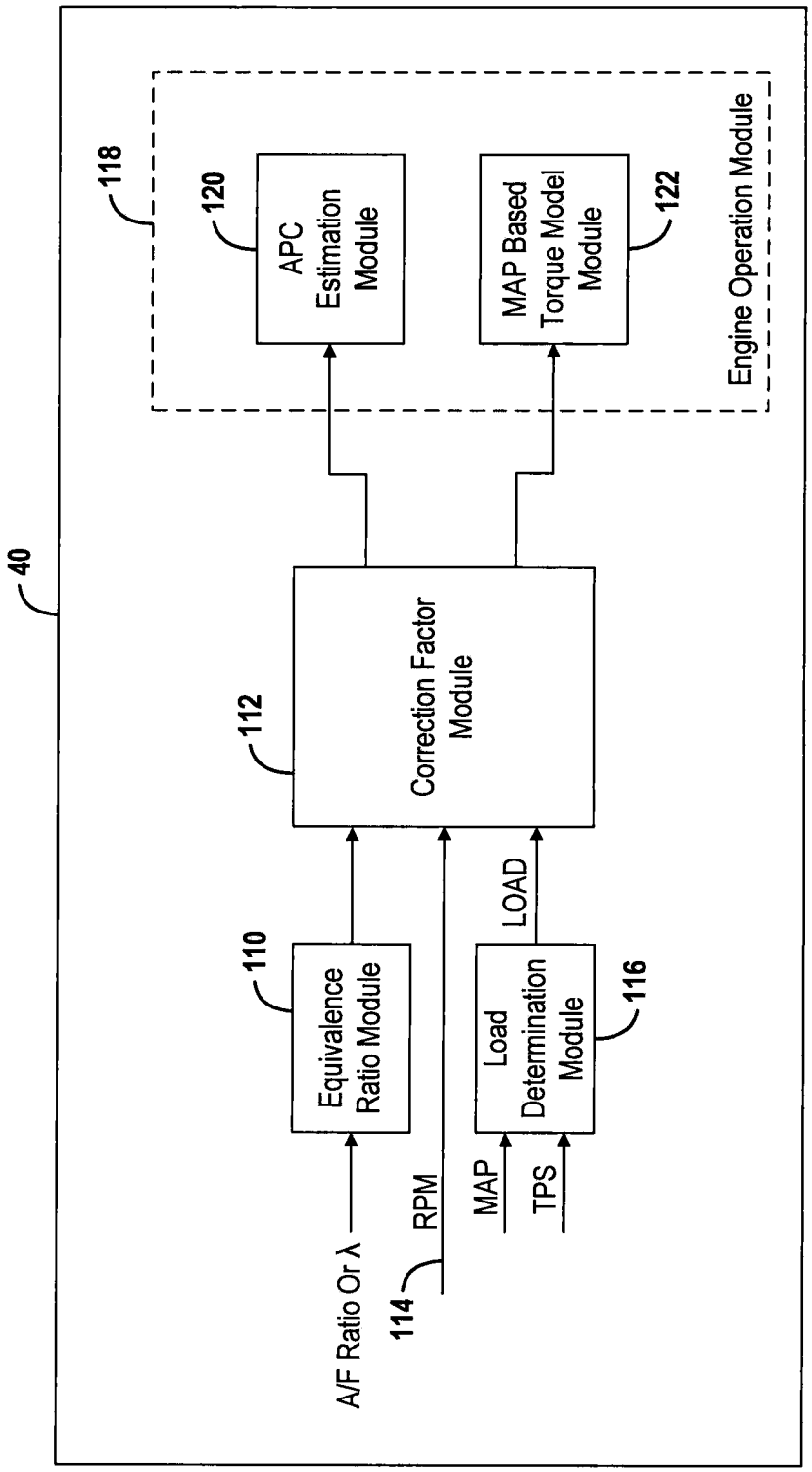
FIG. 2 is a detailed block diagram of the control module of FIG. 1.

Referring now to FIG. 2, the controller 40 is illustrated in further detail. The controller 40 may include an equivalence ratio module 110. The equivalence ratio module 110 may receive an air/fuel ratio signal or λ signal from the air/fuel ratio or λ sensor 60 illustrated in FIG. 1. The equivalence ratio module 110 generates an equivalence ratio signal. The equivalence ratio is the measured fuel to oxidizer ratio over the fuel to oxidizer ratio at stoichiometry. The equivalence ratio may also be provided as one over λ. Where λ is the air/fuel ratio divided by the air/fuel ratio at stoichiometry.

A correction factor module 112 may receive the equivalence ratio signal from the equivalence ratio signal module 110. The correction factor module 112 may also receive an RPM signal 114 from a crankshaft sensor signal or other engine speed sensor signal.

The correction factor module 112 may also receive a load signal from a load determination module 116. The engine load may be determined using the MAP or the TPS signal. Of course, both the MAP and throttle position may be used in a load determination.

The correction factor module 112 generates a correction factor based upon the equivalence ratio, the engine speed and the load, which is based upon the MAP or the TPS signal. The correlation of the equivalence ratio, the engine speed and the load may be experimentally determined in order to determine the charge compensation factor. As will be described below, the amount of compensation may increase as the load on the engine increases. The correction factor module 112 may store a look-up table or chart of correction factors based upon the engine load, engine speed and the equivalence ratio.

The correction factor from the correction factor module 112 may be used for regulating the operation of the engine at an engine operation module 118. The engine operation module 118 may control an engine function in response to the correction factor.

The engine operation module 118 may include a MAP-based air-per-cylinder (APC) module 120 or a MAP-based torque module 122. Both a MAP-based APC and a MAF-based APC may be used since the MAF measurement may not be accurate under certain conditions such as at transient or intake reversion mode. Engine controls may selectively use both APC determinations. In the following example, MAP-based APC is used.

The APC estimation module 120 may generate an estimated APC estimate based upon the correction factor. The APC ($m_{cyl}$) may be a function of the MAP×$V_{cyl}$×VE/R and ×ChgTemp×correction factor, where MAP is the manifold absolute pressure, $V_{cyl}$ is the volume of the cylinder, VE is the volume efficiency determined as a function of load and engine speed, R is a universal constant, ChgTemp is the charge temperature, and a correction factor is the correction factor determined in the correction factor module 112.

The correction factor module 112 may also provide the correction factor to a MAP-based torque model module 122. The MAP-based torque model module 120 may generate a torque based upon the MAP. As described above, the MAP signal may not compensate for fuel evaporation and, thus, may provide incorrect readings during certain engine operating conditions, such as under high load. The air torque may be determined using the intake charge temperature. The air torque is typically calibrated at standard temperature and pressure for dynamometer operation. The air torque may be a function of RPM, the cam phaser position and spark timing. The correction factor may be multiplied by the air torque model to provide a corrected MAP torque determination.

Figure 3:
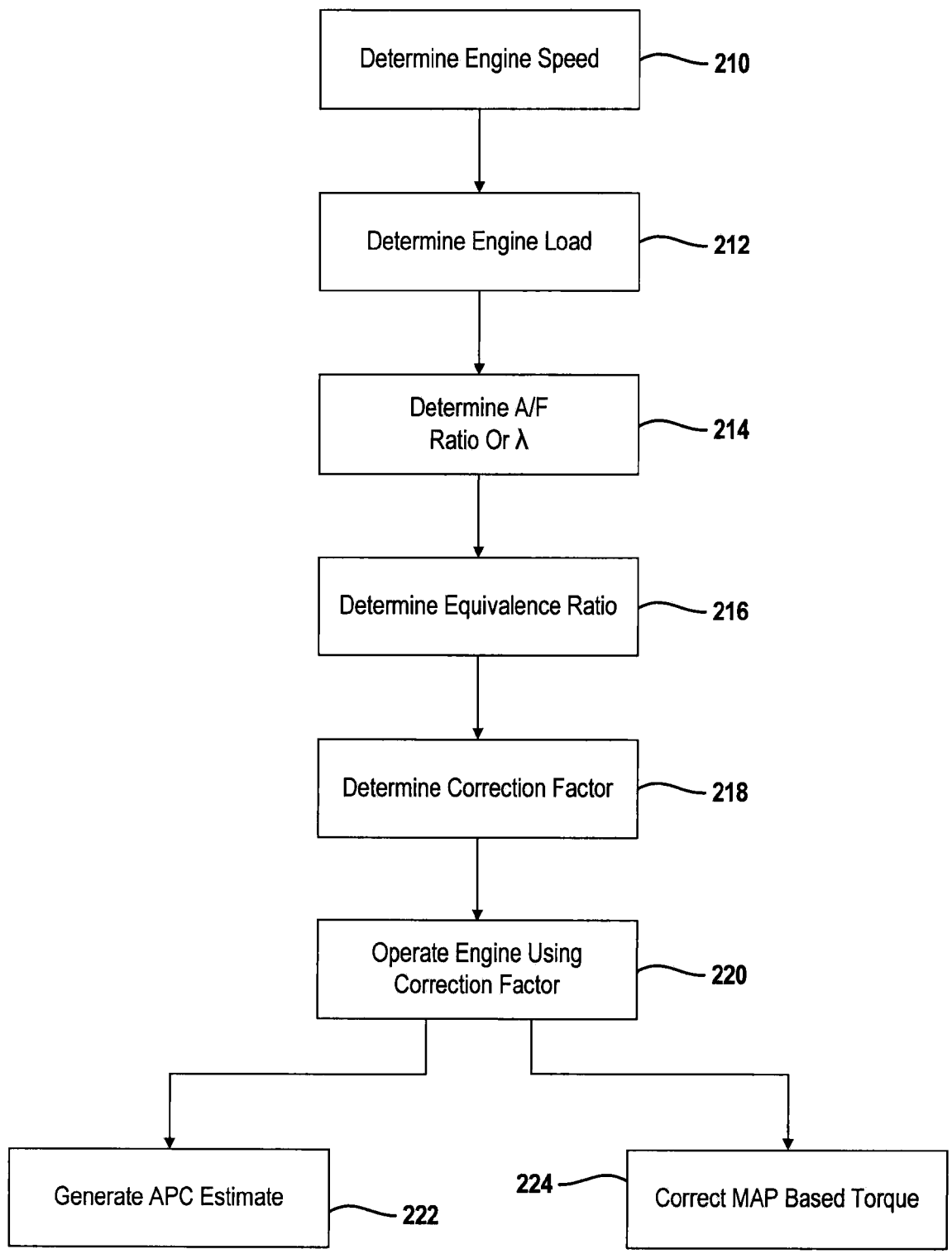
FIG. 3 is a flowchart illustrating steps of the present disclosure.

Referring now to FIG. 3, a method for operating the engine based upon the correction factor is set forth. In step 210, the engine speed is determined. Engine speed, as mentioned above, may be determined from a crankshaft sensor. In step 212, an engine load is determined. The engine load may be determined using the MAP or the TPS signal. In step 214, the air/fuel ratio or λ may be determined. The air/fuel ratio or λ may be used to determine an equivalence ratio in step 216. In step 218, a correction factor based upon the air/fuel ratio or λ, the engine load and the engine speed may be determined. In step 220, the engine is operated using the correction factor. Examples of engine operation are provided in step 222, which generates a modified APC estimate based upon the correction factor. In another example, the MAP-based torque may be corrected using the correction factor in step 224.

Figure 4:
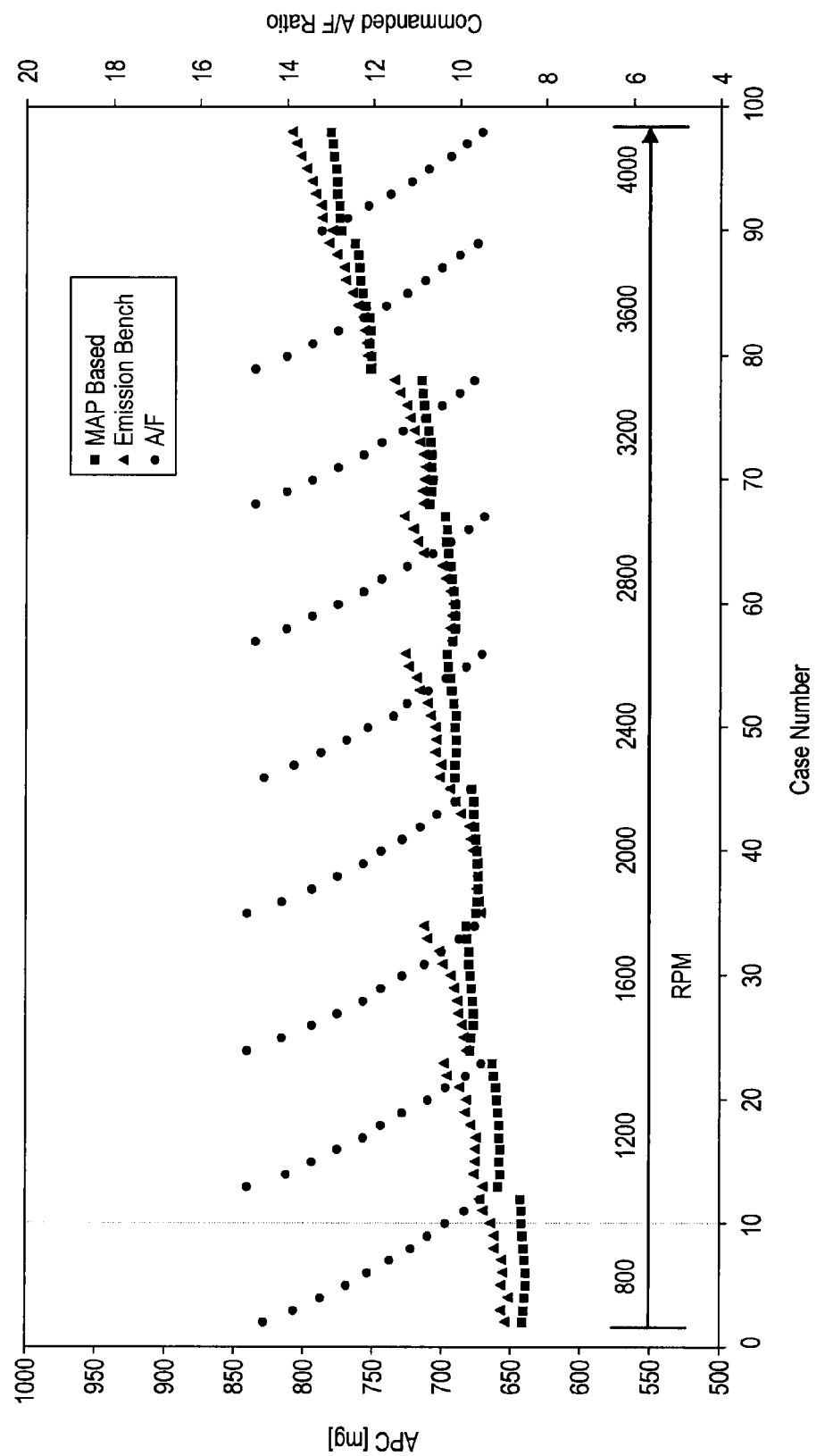
FIG. 4 is a plot illustrating air/fuel ratio and air-per-cylinder.

Referring now to FIG. 4, a plot illustrating air/fuel ratio that changes from lean to rich (ratio from high to low) at different RPM is illustrated with circles. A calculated APC using the MAP is set forth in squares. Another calculated APC from emissions-based bench analysis is illustrated in Triangles. The emission-based bench analysis is fairly accurate to identify the air consumed based on the measured fuel supply and λ reading. Of course, in practice the emissions bench based laboratory approach cannot be used because the fuel burnt is not metered or measured. The correction factor is thus determined to bring the APC measurement from the MAP sensor up to the triangle-based representations. Thus, the correction factor may compensate the inaccuracy or incapability of the MAP-based determination. Each engine type may be calibrated to determine different correction factors.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of regulating operation of an internal combustion engine, the method comprising:
    determining an engine load;
    determining an equivalence ratio;
    generating a correction factor based on the engine load, the equivalence ratio and an engine speed;
    estimating an air per cylinder (APC) based on the correction factor;
    estimating a torque of the engine based on the correction factor; and
    controlling operation of the engine based on the APC and the torque.

2. A method as recited in claim 1 wherein determining an engine load comprises determining the engine load based on a manifold absolute pressure (MAP) of said engine.

3. A method as recited in claim 1 wherein determining an engine load comprises determining the engine load based on a throttle position of said engine.

4. A method as recited in claim 1 wherein determining an equivalence ratio comprises determining the equivalence ratio based on an air/fuel sensor signal or a lambda (λ) sensor signal.

5. A method as recited in claim 1 wherein estimating an APC comprises determining the APC further based on a manifold absolute pressure (MAP) and a volumetric efficiency.

6. A method as recited in claim 1 wherein estimating a torque based on the correction factor comprises estimating the torque based on the correction factor, an intake air temperature, and engine speed.

7. A method as recited in claim 1 wherein controlling the operation of the engine comprises controlling the operation of the engine to overcome a cooling effect of fuel evaporation.

8. A method as recited in claim 1 wherein controlling operation of the engine comprises controlling operation of the engine to overcome a change in volumetric efficiency due to a cooling effect of fuel evaporation.

9. A control system for controlling operation of an internal combustion engine, the system comprising:
    a load determination module that determines an engine load;
    an equivalence ratio module that determines an equivalence ratio;
    a correction factor module that generates a correction factor based on the engine load, the equivalence ratio, and engine speed;
    an air-per-cylinder (APC) estimation module that estimates an APC based on the correction factor;
    a torque model module that estimates a torque of the engine based on the correction factor; and
    an engine operation module that regulates operation of the engine based on the APC and the torque.

10. A control system as recited in claim 9 wherein the engine load is based on a manifold absolute pressure (MAP) of said engine.

11. A control system as recited in claim 9 wherein the engine load is based on a throttle position of said engine.

12. A control system as recited in claim 9 wherein the equivalence ratio is based on an air/fuel sensor signal or a lambda (λ) sensor signal.

13. A control system as recited in claim 9 wherein the APC estimation module estimates the APC based on a manifold absolute pressure (MAP) and a volumetric efficiency.

14. A control system as recited in claim 9 wherein the engine operation module controls the operation of the engine to overcome a cooling effect of fuel evaporation.

15. A control system as recited in claim 9 wherein the APC estimation module estimates the APC as a function of MAP*$V_{cyl}$*VE/R and ChgTemp* Correction Factor, where MAP is a manifold absolute pressure, $V_{cyl}$ is a volume of a cylinder, VE is a volume efficiency determined as a function of load and engine speed, R is a universal constant, ChgTemp is a charge temperature, and Correction Factor is the correction factor.

16. A control system as recited in claim 9 wherein the torque model module determines an air torque based upon a manifold absolute pressure (MAP), an intake air temperature, engine speed, a cam phaser position, and spark timing, and determines the torque based on the air torque and the correction factor.

17. A control system as recited in claim 16 wherein the torque model module sets the torque equal to the air torque multiplied by the correction factor.

18. A method as recited in claim 1 wherein estimating an APC comprises estimating the APC as a function of MAP*$V_{cyl}$*VE/R and ChgTemp* Correction Factor, where MAP is a manifold absolute pressure, $V_{cyl}$ is a volume of a cylinder, VE is a volume efficiency determined as a function of load and engine speed, R is a universal constant, ChgTemp is a charge temperature, and Correction Factor is the correction factor.

19. A method as recited in claim 1 further comprising determining an air torque based upon a manifold absolute pressure (MAP), an intake air temperature, engine speed, a cam phaser position, and spark timing,
    wherein estimating the torque of the engine comprises determining the torque based on the air torque and the correction factor.

20. A method as recited in claim 19 wherein determining the torque based on the air torque and the correction factor comprises setting the torque equal to the air torque multiplied by the correction factor.

* * * * *